United States Patent
Post et al.

(10) Patent No.: US 12,497,949 B2
(45) Date of Patent: *Dec. 16, 2025

(54) SYSTEMS AND METHODS OF COORDINATED YAW CONTROL OF MULTIPLE WIND TURBINES

(71) Applicant: WindESCo, Inc., Boston, MA (US)

(72) Inventors: Nathan L. Post, Malden, MA (US); Danian Zheng, Boston, MA (US); Peter Bachant, Cambridge, MA (US); Mohit Dua, Boston, MA (US)

(73) Assignee: WindESCo, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,597

(22) Filed: May 1, 2023

(65) Prior Publication Data

US 2023/0272775 A1    Aug. 31, 2023

Related U.S. Application Data

(63) Continuation of application No. 17/847,701, filed on Jun. 23, 2022, now Pat. No. 11,639,710.
(Continued)

(51) Int. Cl.
*F03D 7/04*    (2006.01)
*F03D 17/00*   (2016.01)

(52) U.S. Cl.
CPC ............. *F03D 7/048* (2013.01); *F03D 17/00* (2016.05); *F05B 2270/204* (2020.08);
(Continued)

(58) Field of Classification Search
CPC .... F03D 7/048; F03D 17/00; F05B 2270/204; F05B 2270/32; F05B 2270/321; F05B 2270/329
See application file for complete search history.

(56) References Cited

U.S. PATENT DOCUMENTS

| 7,299,627 B2 | 11/2007 | Corten et al. |
| 9,086,337 B2 | 7/2015 | Merida et al. |

(Continued)

FOREIGN PATENT DOCUMENTS

| WO | WO 2018/009280 A1 | 1/2018 |
| WO | WO 2020/028578 A1 | 2/2020 |

OTHER PUBLICATIONS

International Search Report and Written Opinion mailed Oct. 11, 2022 in related International Application No. PCT/US2022/034682.
(Continued)

*Primary Examiner* — Tulsidas C Patel
*Assistant Examiner* — Thomas K Quigley
(74) *Attorney, Agent, or Firm* — Eric L. Lane; Green Patent Law

(57) ABSTRACT

Systems and methods of autonomous farm-level control and optimization of wind turbines are provided. Exemplary embodiments comprise a site controller running on a site server. The site controller collects and analyzes yaw control data of a plurality of wind turbines and wind direction data relating to the plurality of wind turbines. The site server determines collective wind direction across an area occupied by the plurality of wind turbines and sends yaw control signals including desired nacelle yaw position instructions to the plurality of wind turbines. The site controller performs wake modeling analysis and determines desired nacelle positions of one or more of the plurality of wind turbines. The desired nacelle yaw position instructions systematically correct static yaw misalignment for all of the plurality of wind turbines. Embodiments of the disclosure provide means to perform whole site or partial site level controls of the yaw controllers of a utility scale wind turbine farm. The overall effect of the coordinated yaw control of wind turbines across the whole or partial site is intended to keep the (Continued)

wake loss of the wind turbines from the upstream wind turbines to the minimum and to maximize the production of turbines that are not waking other turbines.

18 Claims, 10 Drawing Sheets

Related U.S. Application Data

(60) Provisional application No. 63/271,527, filed on Oct. 25, 2021, provisional application No. 63/215,175, filed on Jun. 25, 2021.

(52) U.S. Cl.
CPC ..... *F05B 2270/32* (2013.01); *F05B 2270/321* (2013.01); *F05B 2270/329* (2013.01)

(56) References Cited

U.S. PATENT DOCUMENTS

| | | |
|---|---|---|
| 9,140,239 B2 | 9/2015 | Dalsgaard |
| 10,107,261 B2 | 10/2018 | Zheng |
| 10,465,655 B2 | 11/2019 | Brake et al. |
| 10,697,439 B2 | 6/2020 | Wheeler |
| 10,815,972 B2 | 10/2020 | Evans |
| 11,047,362 B2 | 6/2021 | Kiles et al. |
| 11,313,351 B2 | 4/2022 | Post et al. |
| 11,319,926 B2 | 5/2022 | Gregg |
| 2009/0317250 A1 | 12/2009 | Gamble |
| 2012/0257968 A1 | 10/2012 | Dalsgaard |
| 2014/0234103 A1 | 8/2014 | Obrecht |
| 2014/0348650 A1 | 11/2014 | Hansen |
| 2015/0240783 A1 | 8/2015 | Kii |
| 2015/0308416 A1 | 10/2015 | Ambekar et al. |
| 2016/0305403 A1 | 10/2016 | Zheng |
| 2018/0010576 A1 | 1/2018 | Brake et al. |
| 2018/0187646 A1 | 7/2018 | Arlaban et al. |
| 2018/0298880 A1 | 10/2018 | Ma et al. |
| 2018/0363632 A1 | 12/2018 | Wheeler |
| 2018/0372886 A1 | 12/2018 | Weber |
| 2020/0018289 A1 | 1/2020 | Bai et al. |
| 2020/0102932 A1 | 4/2020 | Hovgaard |
| 2020/0124024 A1 | 4/2020 | Gregg |
| 2020/0226480 A1 | 7/2020 | Johnston et al. |
| 2020/0300227 A1 | 9/2020 | Evans |
| 2020/0318613 A1 | 10/2020 | Sorensen |
| 2021/0148331 A1 | 5/2021 | Lin et al. |
| 2021/0310461 A1 | 10/2021 | King et al. |

OTHER PUBLICATIONS

Extended European Search Report mailed Mar. 28, 2025 in related European Patent Application No. 22829291.8.

Park, Jinkyoo et al. A data-driven, cooperative wind farm control to maximize the total power production Applied Energy, Elsevier Sci Pub GB, vol. 165 Dec. 31, 2015.

Gebraad, P.M.O. et al. A data-driven model for wind plant power optimization by yaw control 2015 American Control Conf IEEE Jun. 4, 2014.

Kanev, Stoyan Dynamic wake steering an dits impact on wind farm power production and yaw actuatro duty, Renewable Energy, Pergamon Press vol. 146 Jun. 25, 2019.

SYSTEMS AND METHODS OF COORDINATED YAW CONTROL OF MULTIPLE WIND TURBINES

CROSS-REFERENCE TO RELATED APPLICATIONS

This application is a continuation of and claims priority to U.S. patent application Ser. No. 17/847,701, filed Jun. 23, 2022, which is a non-provisional of and claims priority to U.S. Patent Application No. 63/271,527, filed Oct. 25, 2021, and U.S. Patent Application No. 63/215,175, filed Jun. 25, 2021, each of which is hereby incorporated by reference in its entirety.

FIELD

The present disclosure relates to coordinating yaw control of multiple wind turbines. The present disclosure further relates to methods of improving wind farm energy extraction through enhanced wind direction measurement and nacelle position control.

BACKGROUND

Wind power is a major source of electricity, with nearly 600 GW of global installed capacity at the end of 2018. This is expected to increase to nearly 800 GW in 2021. However, operating wind power projects and wind farms continue to underperform on power output by 9% on average. This, coupled with much higher than expected unscheduled maintenance costs caused mostly by a high component failure rate, is leading to lower revenue and higher operating expense. The industry is further challenged by reduction in incentives and subsidies as power prices continue to drop. Therefore, there is significant demand for systems to augment or retrofit existing wind turbines to improve energy production.

Most of the time multiple wind turbines are installed in relatively close proximity to one another to facilitate use of areas with good wind resources and efficient use of land, grid infrastructure, and maintenance personnel. This collection of turbines is called a wind plant or wind farm. The wind turbines in a wind farm are designed to maximize power production individually today. However, turbines in the upstream of the wind could be generating blockage and wakes that reduce the production of the downstream turbines and increase the turbulence loading on the down-stream turbines. In the worst case there could be up to 15% reduction of the overall wind farm production because of this effect.

There have been multiple technologies such as axial wake management, which reduce the upstream turbine power to reduce the wake effects to downstream turbines, and wake steering, which steers the upstream turbines wake away from the down-stream turbines by yawing the upstream turbines. The wake steering method is more effective at increasing overall farm energy production. However, there are issues that keep the implementation from achieving its production improvement potential. These limitations are: 1) the wind direction measured at individual wind turbines does not reflect the overall wind direction flowing through the wind farm. Hence the wake steering could not be achieved effectively just based on the local measurement of the wind direction at the steered upstream turbine; 2) The turbine yaw control system might be slow and inaccurate and that will make the real-time wake steering control less effective; 3) the relative wind direction measurements on the turbines may have an unknown bias called yaw misalignment, due to instrument calibration, installation and wake flow around the nacelle. Without correction of these problems, the turbine will not fully benefit from the wake steering.

Wind farm flow control is a very complex problem, and to this point the limited wake steering field demos have only used "open loop" control algorithms, where offsets are determined from a steady state model. However, real world flows are dynamic, and controllers need to be able to adapt to changing wind conditions.

Thus, there is a need for more advanced systems and methods that solve the wake steering problems at all levels, i.e., individual turbine relative wind direction measurement accuracy, yaw control response, group or farm level wind direction detection, and group or farm level wake steering control to improve overall production. There is a need for a wind farm controller that learns from its operational data.

SUMMARY

Embodiments of the present disclosure alleviate to a great extent the disadvantages of known yaw control systems for wind turbines by providing means to perform whole site or partial site level controls of the yaw controllers of a utility scale wind farm. The overall effect of the coordinated yaw control of wind turbines across the whole or partial site is intended to keep the wake loss of the wind farm to the minimum and to maximize the production of turbines that are not waking other turbines. Disclosed coordinated yaw control systems learn from their own operational data, getting better at predicting the effects of wake steering, and therefore get closer and closer to the theoretical maximum power output for all conditions.

In exemplary embodiments, this is achieved by 1) using data from multiple turbines and other sources to determine the overall wind direction across the turbine group or wind farm; 2) a coordinated yaw control at farm level; 3) a collective yaw control across multiple neighboring turbines to optimally align those turbines to point into the wind; 4) a turbine level yaw control that achieves the response speed and accuracy of yaw control needed for effective implementation of 2); 5) a turbine level automated or periodic yaw misalignment correction that determines any calibration offset required for the wind direction measurements from each turbine to enable 1).

Exemplary embodiments take advantage of the fact that individual turbines in a wind plant are essentially spatially distributed data sources. When a change in atmospheric conditions is experienced by one turbine, it can be predicted from data from other turbines at a wind plant. The predicted change can then be used to optimize the performance of that individual turbine. Different conditions that can be predicted include, but are not limited to, wind direction change enabling the turbine to move to the predicted nacelle position in advance of the actual change; wind speed change allowing turbines to prepare in advance of the change; onset of icing, allowing turbines to change their operational strategy to reduce the impact of icing on the blades; and extreme wind events like gusts and large changes in wind direction allowing the turbine to implement a protective strategy in advance.

An exemplary method of autonomous farm-level control and optimization of wind turbines comprises collecting and analyzing yaw control data of one or more of a plurality of wind turbines, collecting and analyzing wind direction data across an area occupied by the plurality of wind turbines, and determining a collective wind direction across the area. Methods then include collecting and analyzing power production data of one or more of the plurality of wind turbines and determining whether the one or more of the plurality of wind turbines is capturing maximum power. The desired nacelle yaw positions of one or more of the plurality of wind turbines then are determined, and yaw control signals including desired nacelle yaw position instructions are sent to one or more of the plurality of wind turbines based upon analysis of the yaw control data, wind direction data, and power production data.

In exemplary embodiments, methods further comprise determining which of the plurality of wind turbines are upstream wind turbines and assigning upstream wind turbines desired nacelle yaw positions such that downstream wind turbines increase power production. If one or more of the plurality of wind turbines is not capturing maximum power, yaw misalignment errors may be calculated at individual turbine level and offset corrections sent to one or more of the plurality of wind turbines. Methods may also include eliminating yaw zero error or yaw misalignment of one or more of the plurality of wind turbines.

Exemplary methods further comprise predicting a change in wind direction for one of the plurality of wind turbines from the collected and analyzed wind direction data from other wind turbines of the plurality of wind turbines. Instructions may be sent to the one of the plurality of wind turbines for desired nacelle yaw position in advance of the predicted change in wind direction. In exemplary embodiments, the desired nacelle yaw position instructions systematically correct static yaw misalignment for all of the plurality of wind turbines, thereby reducing energy loss.

Exemplary embodiments of an autonomous system for improving energy extraction of a plurality of wind turbines comprise a site controller running on a site server. The site controller collects and analyzes yaw control data of a plurality of wind turbines and wind direction data relating to the plurality of wind turbines. The site server determines collective wind direction across an area occupied by the plurality of wind turbines and sends yaw control signals including desired nacelle yaw position instructions to the plurality of wind turbines. The system may further comprise an edge device configured to be communicatively coupled to a turbine control unit. The edge device supplies yaw control data to the site controller and receives the yaw control signals from the site controller.

In exemplary embodiments, the site server is in communication with a system cloud performing offline data analytics and model optimization and providing optimization instructions to the site controller. The site controller may perform wake modeling analysis and determine desired nacelle yaw positions of one or more of the plurality of wind turbines. In exemplary embodiments, the desired nacelle yaw position instructions systematically correct static yaw misalignment for all of the plurality of wind turbines. In exemplary embodiments, the site controller determines which of the plurality of wind turbines are upstream wind turbines and assigns upstream wind turbines desired nacelle yaw positions such that downstream wind turbines increase power production. The site controller may derate the upstream wind turbines.

In exemplary embodiments, the site controller receives data from one or more of: Metmast, LiDar, RADAR, a weather forecast, or a metrological/fluid dynamics simulation. The site controller may determine the collective wind direction in real time. In exemplary embodiments, the site controller tracks high frequency yaw control data history and power production data history. The site controller may provide wake steering instructions to one or more of the plurality of wind turbines.

In exemplary embodiments, the site controller determines whether one or more of the plurality of wind turbines is capturing maximum power. If the site controller determines that one or more of the plurality of wind turbines is not capturing maximum power, the site controller calculates yaw misalignment errors at individual turbine level and sends offset corrections to one or more retrofit data communication and processing units.

In exemplary embodiments, the site controller predicts a change in wind direction for one of the plurality of wind turbines from the collected and analyzed wind direction data from other wind turbines of the plurality of wind turbines. The site controller may send instructions to one of the plurality of wind turbines for desired nacelle yaw position in advance of the predicted change in wind direction.

Exemplary embodiments of an autonomous system for farm-level control and optimization of a plurality of wind turbines comprise a site controller running on a site server. The site controller collects and analyzes yaw control data of a plurality of wind turbines and wind direction data relating to the plurality of wind turbines. The site server determines collective wind direction across an area occupied by the plurality of wind turbines and sends yaw control signals including desired nacelle yaw position instructions to the plurality of wind turbines. The site controller performs wake modeling analysis and determines desired nacelle yaw positions of one or more of the plurality of wind turbines. The desired nacelle yaw position instructions systematically correct static yaw misalignment for all of the plurality of wind turbines.

In exemplary embodiments, the site server is in communication with a system cloud performing offline data analytics and model optimization and providing optimization instructions to the site controller. The site controller may predict a change in wind direction for one of the plurality of wind turbines from the collected and analyzed wind direction data from other wind turbines of the plurality of wind turbines. In exemplary embodiments, the site controller sends instructions to the one of the plurality of wind turbines for desired nacelle position in advance of the predicted change in wind direction. The site controller learns from its operational data, thereby improving its ability to predict effects of wake steering.

Accordingly, it is seen that systems and methods of coordinating yaw control of multiple wind turbines and methods of improving wind farm energy extraction through enhanced wind direction measurement and nacelle position control are provided. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

Figure 1:
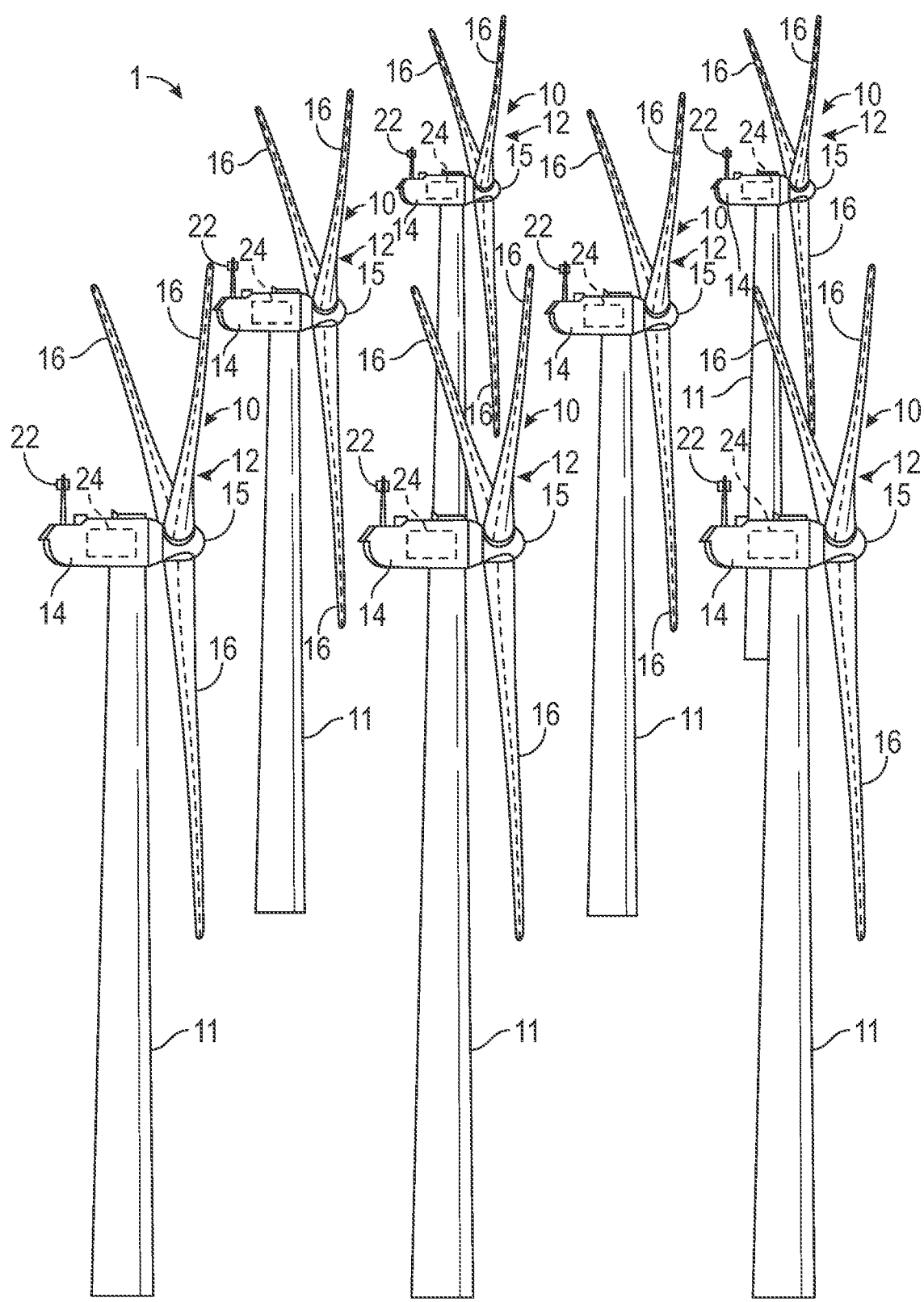
FIG. 1 is a perspective view of an exemplary embodiment of a wind plant in accordance with the present disclosure.
Figure 2A:
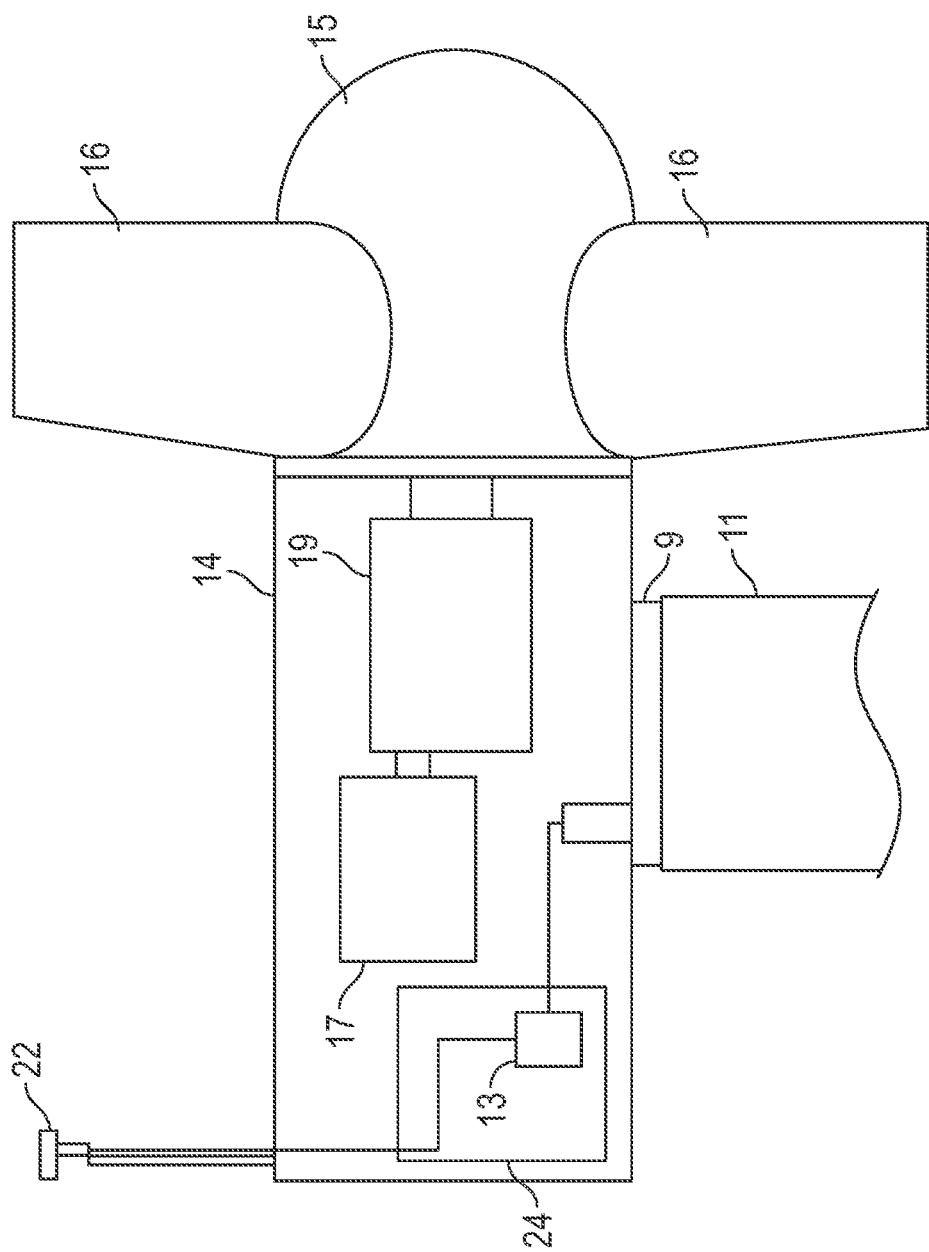
FIG. 2A is a side view of an exemplary embodiment of a wind turbine nacelle showing an exemplary additional SW module in accordance with the present disclosure.
Figure 2B:
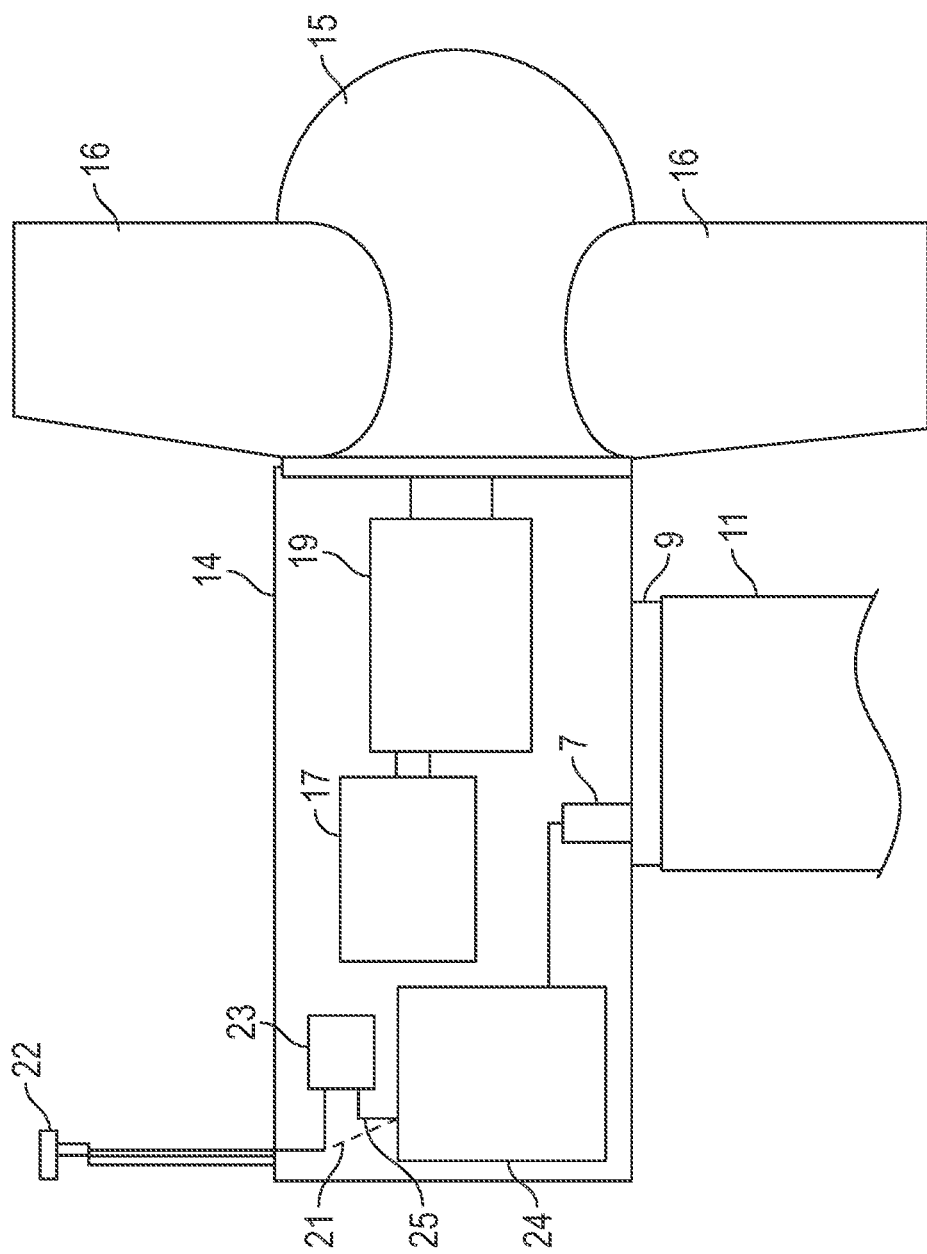
FIG. 2B is a side view of an exemplary embodiment of a wind turbine nacelle showing an exemplary retrofit system for a wind turbine including a retrofit data communication and processing unit installed between the existing wind direction sensor and the turbine control unit in accordance with the present disclosure.
Figure 3:
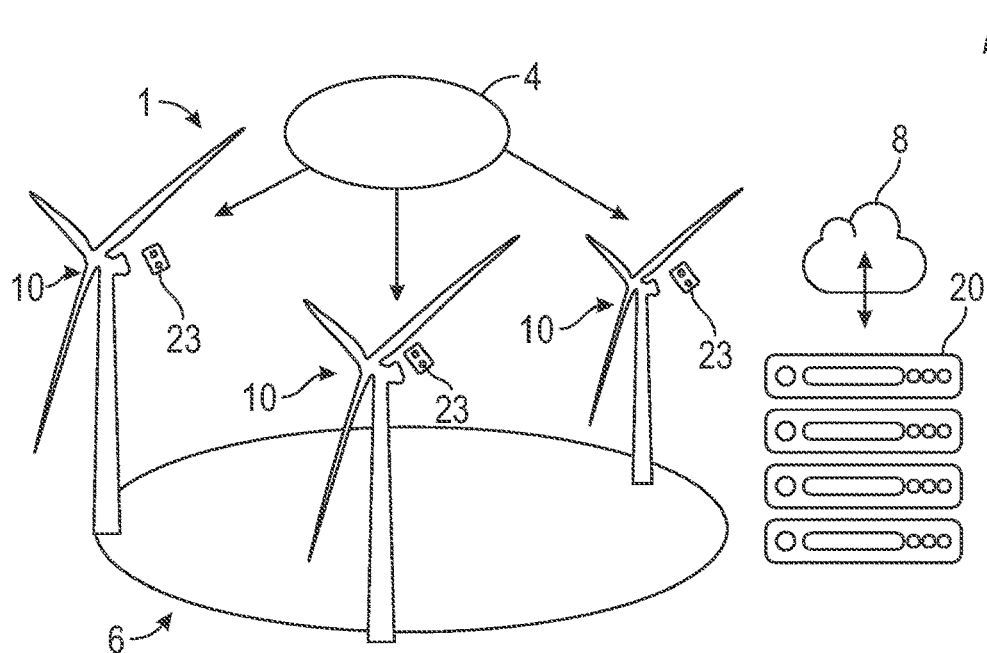
FIG. 3 is a perspective view of an exemplary system for controlling group or wind farm level yaw control behavior and improving energy extraction at a wind plant in accordance with the present disclosure.

Embodiments of the present disclosure provide methods and systems for improving the energy extraction of wind plants. An exemplary wind farm 1 is shown in FIG. 1. A wind farm or wind plant 1 includes a plurality of wind turbines 10. Each wind turbine 10 has a tower 11 and a rotor 12 and a nacelle 14 mounted to the top of the tower 11 along with a yaw bearing 9. The rotor 12 has a plurality of rotor blades 16 coupled to and extending from a rotor hub 15. The rotor hub 15 is rotatably coupled to an electric generator 17 via the main shaft 3. FIGS. 2A and 2B illustrate the major components in the nacelle 14. Various mechanical, electrical and computer systems, including but not limited to, the electric generator 17, a gearbox 19, a yaw motor 7, and a turbine control unit 24, may be housed in the nacelle 14. A retrofit data communication and processing unit 23, described in more detail herein, may be added to the wind turbine 10.

Exemplary methods and systems for controlling group or wind farm level yaw control behavior at a wind plant improve plant performance by making improvements at four levels. At the turbine level, disclosed systems provide more accurate relative wind direction measurement and improve responsiveness of turbine yaw control with additional dynamic yaw control tuning optimization based on the high-speed turbine wind direction sensor history. At site level, systems and methods eliminate yaw zero error or yaw misalignment regularly online in a higher frequency at seconds to minutes based on environmental conditions such as air density, temperature and turbulence.

Once improved, individual turbine yaw control accuracy and performance consider neighboring turbines' measured wind directions to come up with the wind direction flow across a group of turbines 10 or a whole farm 1. Fourth, based on the overall farm level wind speed and the accurate yaw positions across the group of wind turbines 10 or the wind farm 1, the systems deploy a wake steering model such as the NREL FLORIS model. This controls the upstream turbines at the moment to yaw away from wind enough for the downstream turbines to achieve higher production, thereby improving the overall group or farm level power production as a whole. This four-level methodology improves the farm level production to about 3-5% AEP. The final control output at system level is the desired turbine nacelle direction. It should be noted that there could be multiple opportunities to guide the turbine to point to the directions the group or wind farm level controller desires.

With reference to FIGS. 2A-5, an exemplary system 2 and method 3 for improving energy extraction of a plurality of wind turbines 10 will now be described. The system 2 has a coordinated yaw controller 20 that provides control of multiple wind turbines 10. In exemplary embodiments, the coordinated yaw controller 20 is a site level edge device such as an edge computer or sits in the cloud 8 and collects and analyzes yaw control data from the wind turbines 10. More particularly, coordinated yaw controller 20 is a wind turbine group or wind farm level control system implemented in the edge computer or in the cloud 8 that collects high speed wind direction and yaw control inputs and outputs data. It also sends out the yaw control signals to each turbine control unit 24 via an extra control module or unit.

Exemplary implementations could have portions of control systems or processes on edge or cloud computing. Wind plant network communication could be wired or wireless. A GUI and/or wizard-like user interface 25 may be provided for monitoring and controlling the system 2 remotely. The GUI at the wind plant may include real-time feedback on system behavior and on/off control. A cloud GUI is read-only and may be slightly behind real time, displaying the cumulative benefit.

In exemplary embodiments, the coordinated yaw controller 20 determines the collective wind direction across the area 6 of the wind farm 1, also at wind turbine group or wind farm level. The coordinated yaw controller 20 collects the turbine yaw control inputs and outputs high frequency data while monitoring how each wind turbine yaw control behaves. It may send out a yaw bias signal to help the turbine yaw control to achieve better accuracy and response time. The coordinated yaw controller analyzes the high frequency power data to determine how much the yaw misalignment is present for each turbine at current time and send a correction offset signal to each wind turbine 10.

Referring to FIG. 2A, the individual wind turbines 10 could be controlled by any suitable extra controller. One approach is to use the original turbine control software and add a new module inside, e.g., an additional SW module 13 inside the turbine control unit. In exemplary embodiments, the SW module 13 receives the yaw bias command from the coordinated yaw controller in the edge computer or cloud and drives the wind turbine 10 to the position at the speed the coordinated yaw controller 20 desires.

Alternatively, as shown in FIG. 2B, each individual wind turbine could be equipped with a retrofit data communication and processing unit 23 as part of a retrofit system 4 as described in U.S. Pat. No. 11,313,351, issued Apr. 26, 2022, which is hereby incorporated by reference herein in its entirety. The retrofit data communication and processing unit 23 receives nacelle yaw position commands and other signals from the coordinated yaw controller 20 and the technology feeds fictitious yaw error and wind speed signals to the turbine control unit 24 and measures the response. This hardware may be installed on the turbine 10 to enable far level yaw control for the turbine and to provide accurate timely data regarding the nacelle yaw position and measured wind conditions at the turbine to the system.

Additional modules or components could be provided to generate the same improved yaw control performance other than additional hardware inputs or control SW inputs from the edge computer or cloud, such as from additional measurement hardware such as Metmast, LiDAR or RADAR. Also, a turbine control unit software modification could be performed to implement the required controls instead of relying on add-on hardware such as a retrofit data communication and processing unit 23. Advantageously, disclosed systems allow for a decentralized analysis implementation (true swarm computing) implemented on each turbine with all turbines talking to each other. In other words, multiple wind turbines "collaborate" to maximize plant performance.

Figure 4:
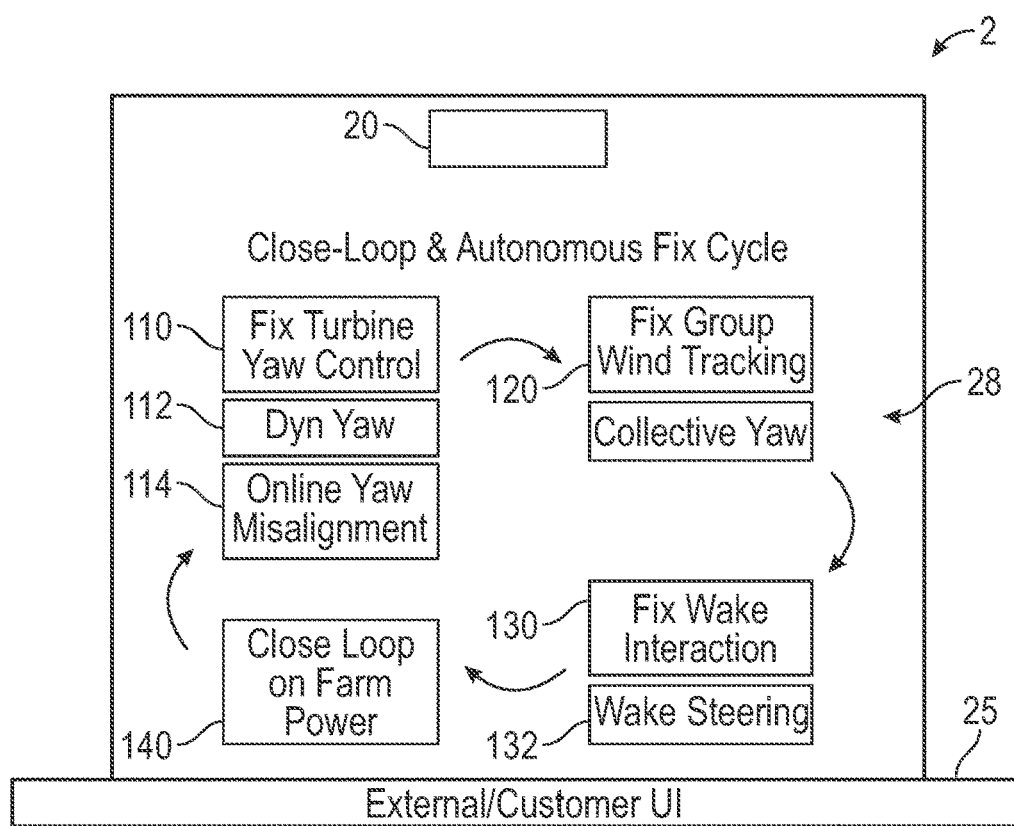
FIG. 4 is a schematic of an exemplary system for controlling group or wind farm level yaw control behavior and improving energy extraction at a wind plant in accordance with the present disclosure.

Turning now to FIG. 4, an exemplary system 2 operates in a closed loop, and the coordinated yaw controller 20 drives an autonomous fix cycle 28. The fix cycle 28 includes improving or fixing 110 turbine yaw control, fixing 120 group wind tracking, fixing 130 wake interaction, and closing 140 the loop on wind farm power. As discussed in more detail herein, the turbine yaw control fix 110 could be by dynamic yaw control 112 and/or yaw misalignment correction 114. At a group level, the group wind tracking fix 120 is by collective yaw control 122. The wake interaction fix 130 may be by a wake steering model 132.

Figure 5:
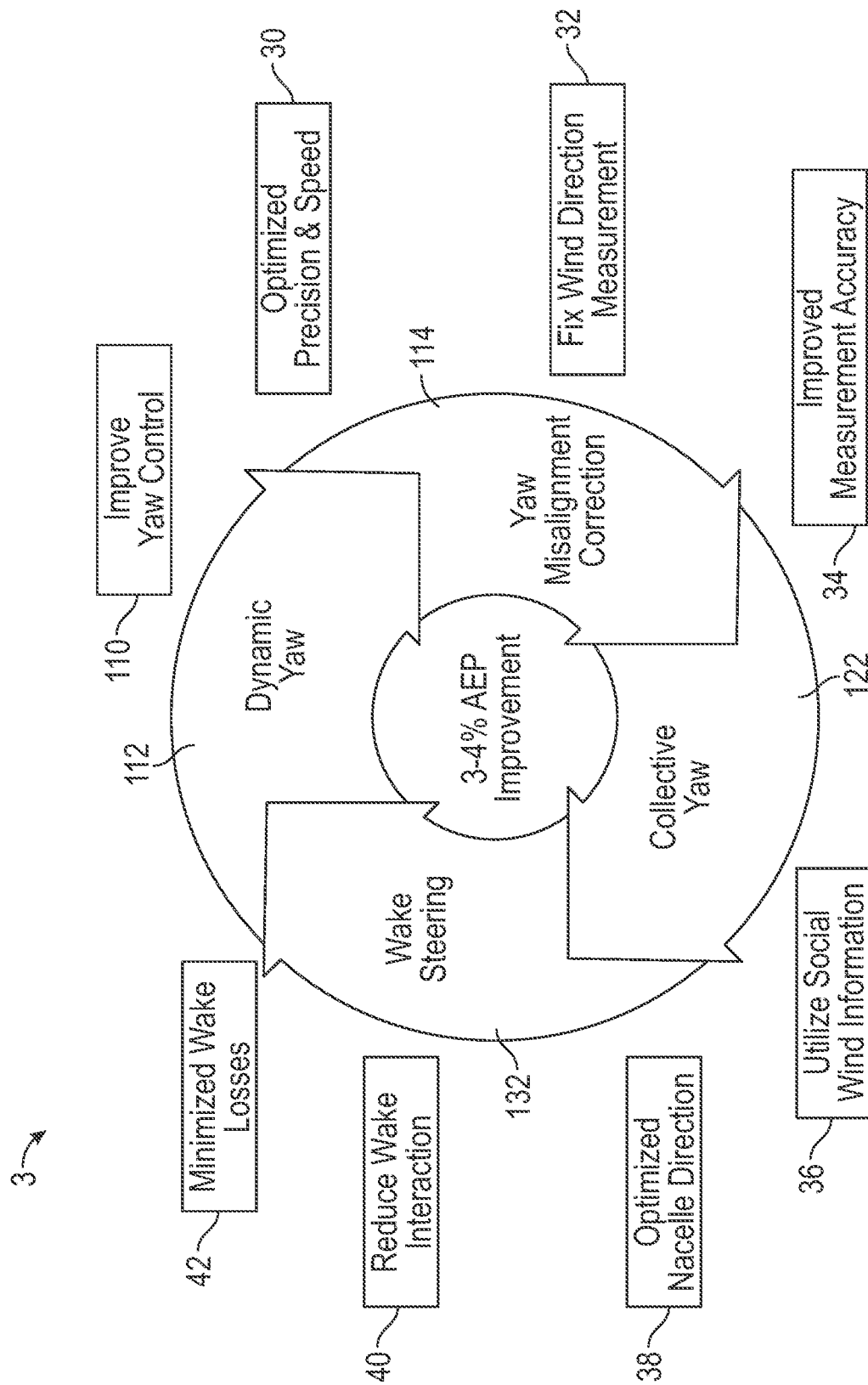
FIG. 5 is a schematic of an exemplary method of controlling group or wind farm level yaw control behavior and improving energy extraction at a wind plant in accordance with the present disclosure.
Figure 6:
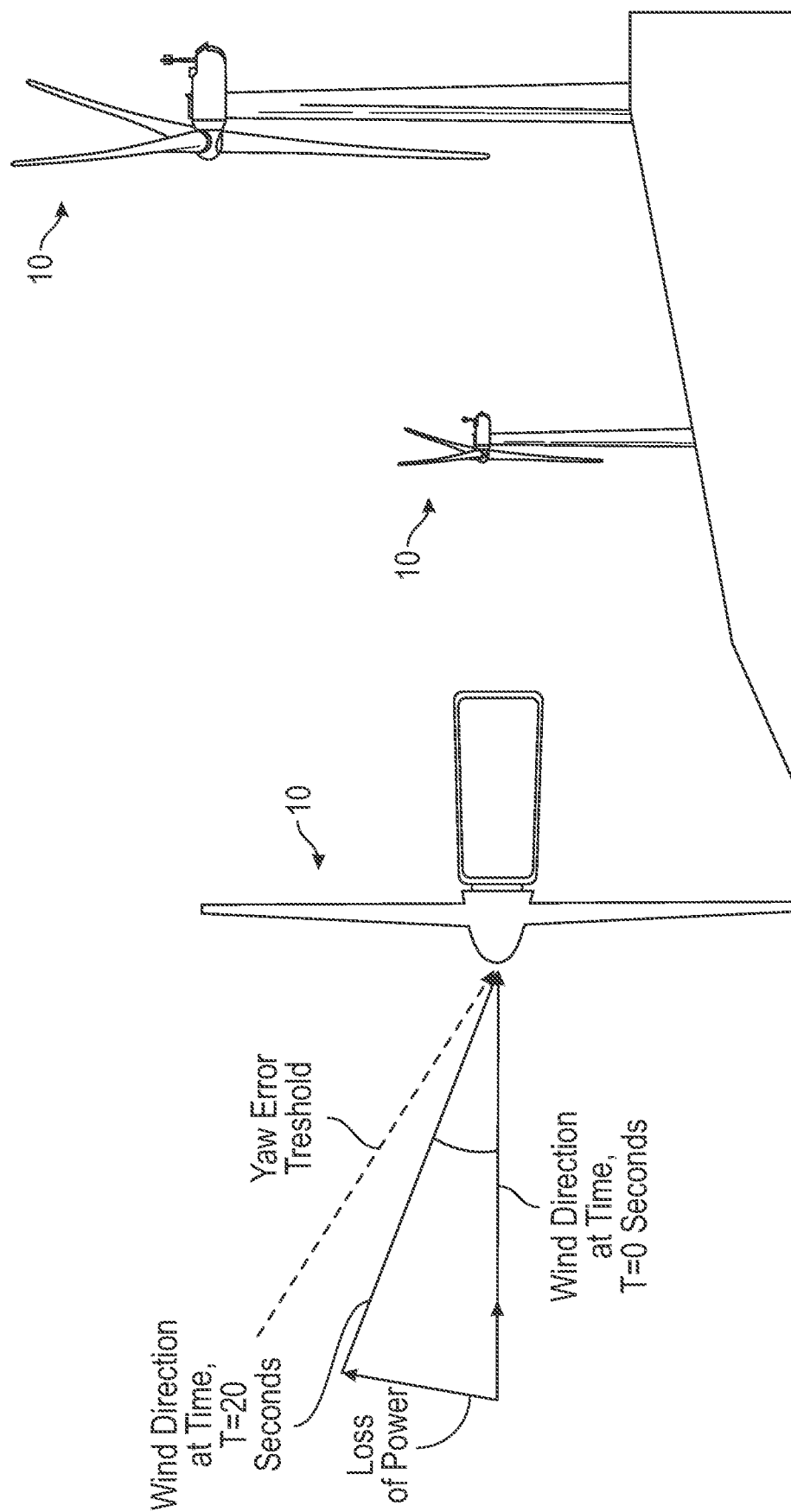
FIG. 6 is a side view and top view of an exemplary method of dynamic yaw optimization in accordance with the present disclosure.

FIG. 5 illustrates an exemplary closed-loop method 3 for improving energy extraction of a plurality of wind turbines. The basic loop or cycle substantially tracks the fix cycle 28 as described above. As shown in the basic loop, the fundamental functions are dynamic yaw control 112, yaw misalignment correction 114, collective yaw control 122, and wake steering 132. Outside the loop the advantageous results associated with the fundamental functions are shown. Dynamic yaw control 112 improves yaw control 30 and optimizes 32 the precision and speed of the turbines. More particularly, as shown in FIG. 6, dynamic yaw optimization minimizes average yaw error and moves the turbine 10 when it makes the most sense to do so, thereby reducing unnecessary yawing. Yaw misalignment correction 114 fixes 32 wind direction measurement and improves 34 measurement accuracy.

Figure 9:
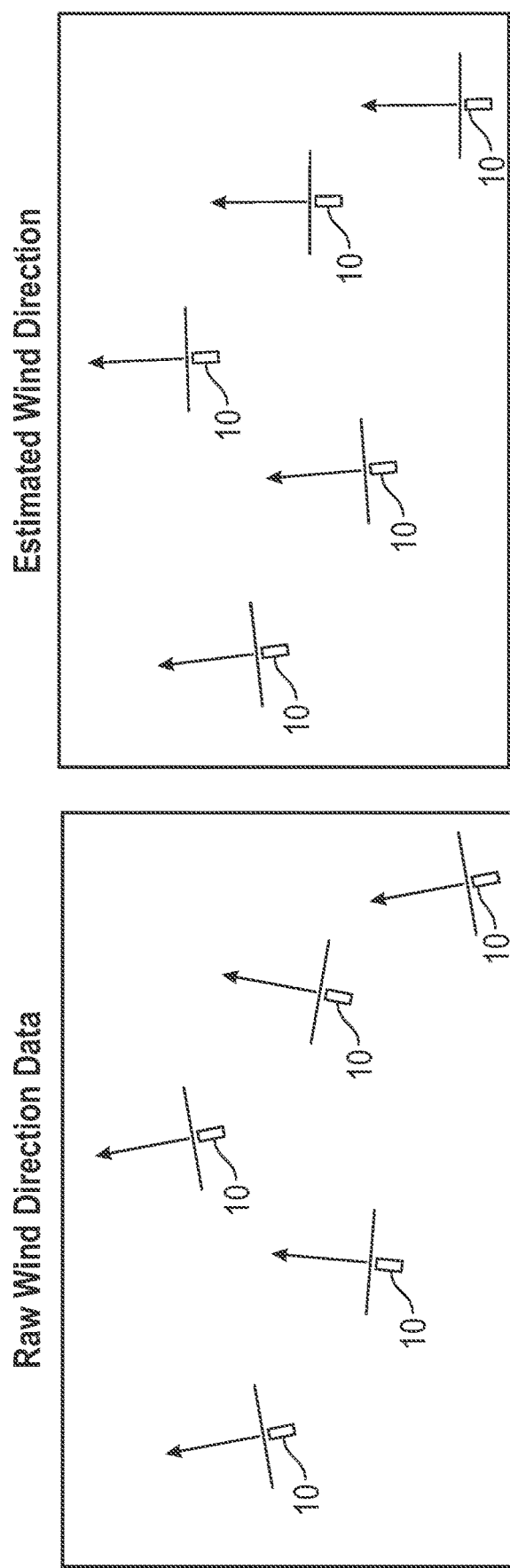
FIG. 9 is a schematic showing an exemplary method of utilizing social wind information across multiple turbines in accordance with the present disclosure.

Collective yaw control 122 utilizes 36 social wind information across multiple turbines. As best seen in FIG. 9, the wind turbines 10 "talk" to each other to provide a more accurate picture of large-scale, site-level wind characteristics, avoiding unnecessary wind motions and improving output. Collective yaw optimization determines the overall wind field and aligns turbines 10 to it. With reference to FIGS. 5 and 9, collective yaw control 122 and wake steering 132 optimize 38 nacelle direction. Wake steering 132 also reduces 40 wake interaction and minimizes 42 wake losses. Exemplary embodiments may focus on wake steering with a simplified collective yaw process and/or refine collective yaw optimization and measure its impact on the instrumented turbines separately. The improved output can either be independent or combined with wake steering, depending on the magnitude of plant wake losses.

In operation, exemplary methods 3 perform the following steps. They collect wind characteristic data from wind turbine sensors 22. The disclosed methods determine bias (yaw misalignment) of each measurement and perform yaw misalignment correction 114 in an automated and regular fashion. They determine the wind flow direction through the wind plant 1 using these measurements and appropriate models. Condition specific adjustments are possible depending on wind direction and wind speed. Exemplary methods determine the desired nacelle yaw positions 38 for each turbine based on the wake modeling to maximize the performance of the whole group or farm 1 as a function of time. They send positions to the wind turbines 10 such that the turbines move in a dynamically optimum way to improve production of energy or reduce mechanical loads on the turbine structure and components.

To improve yaw control accuracy and response at the turbine level, either the yaw control system settings are optimized or an additional controls input is added to the original feedback loop of the turbine yaw control. Such additional input can be an additional bias over the wind direction sensor signal or additional controls output of the coordinated yaw controller 20. In exemplary embodiments, these changes are based on the optimization separately done with a simulated model based on high frequency historic yaw control data at a site level edge computer or in the cloud.

Figure 7:
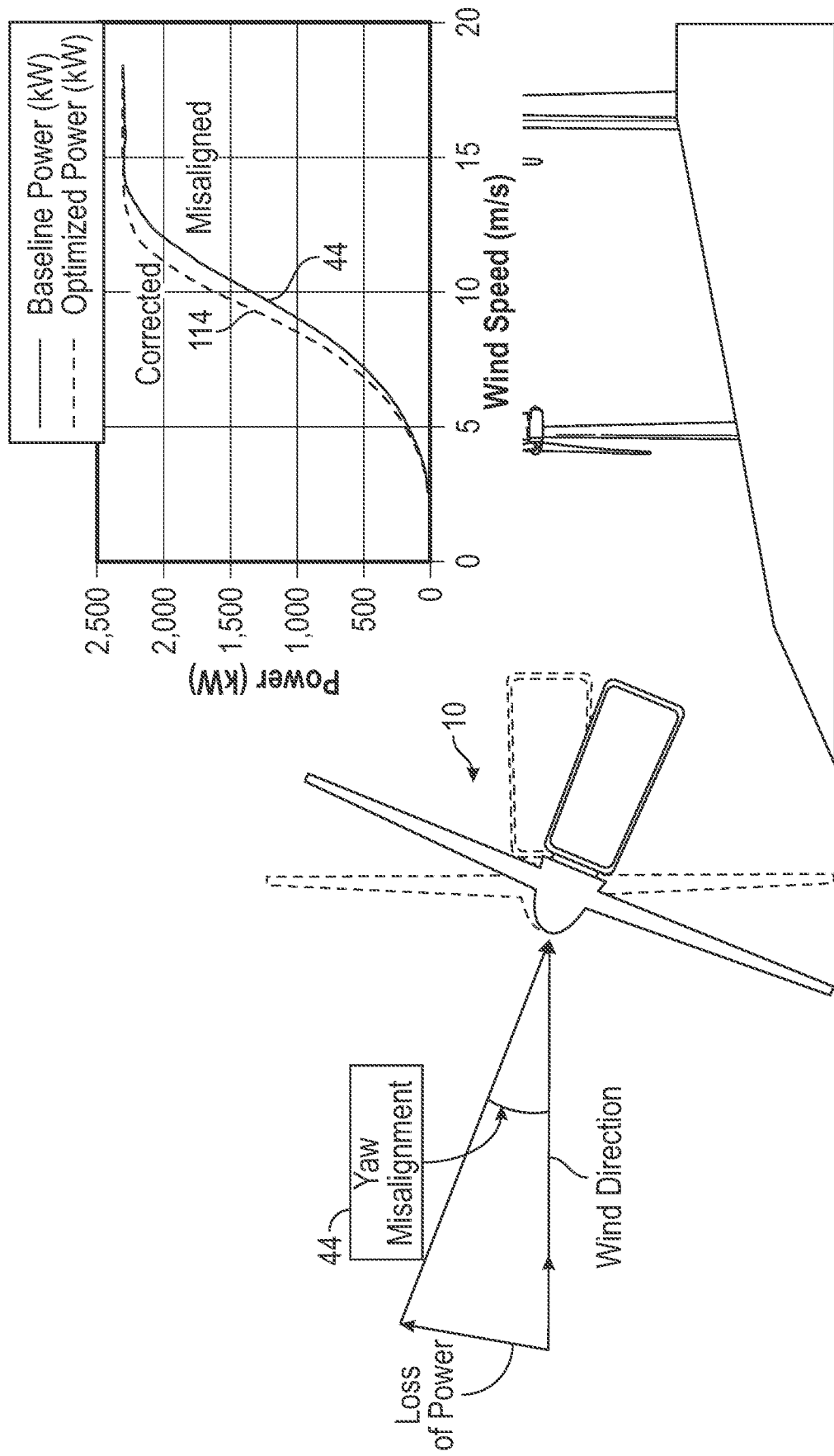
FIG. 7 is a side view, top view, and power curve plot showing an exemplary method of correcting static yaw misalignment errors in accordance with the present disclosure.

Operations include tracking the high frequency yaw control and power production data history of the turbines 10 in the wind plant 1 and yaw control resulting nacelle direction. The coordinated yaw controller 20 determines if each wind turbine 10 is yawing the rotor 12 into the wind to capture the highest power. As best seen in FIG. 7, if it determines that a wind turbine 10 is not in optimal yaw position, then a yaw misalignment error 44 is calculated and applied to the turbine yaw control as an offset correction regularly at second, minutes or hours to account for environmental impacts.

When individual turbine yaw control accuracy and performance is corrected and improved, neighboring turbines' measured wind directions are analyzed to determine the wind direction flow across a group of turbines 10 or a whole wind farm 1. The site level coordinated yaw controller 20 tracks the wind direction sensed across a group of neighboring wind turbines 10 to identify the collective wind direction across the region all these turbines occupy. The local consensus wind direction is determined using all available information at site level. The wind direction changes across this region are determined in real time and support the yaw control at farm level to perform proper wake steering.

Figure 8:
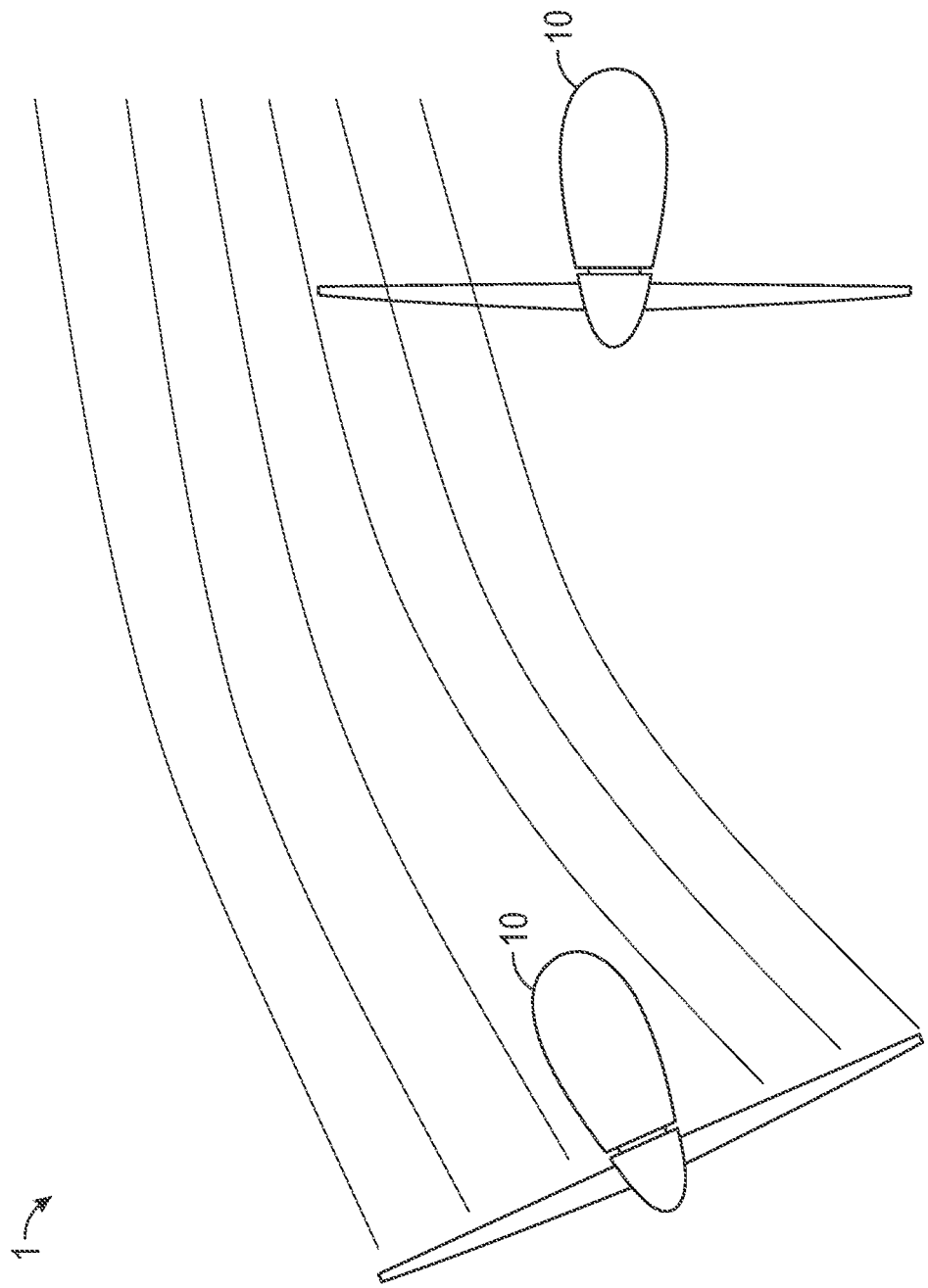
FIG. 8 is a schematic showing an exemplary wake steering method in accordance with the present disclosure.

Based on the overall farm level wind speed and the accurate yaw positions across the group of wind turbines or the wind farm, a wake steering model may be performed, as shown in FIG. 8. This typically is done at site level. The coordinated yaw controller 20 determines which are the upstream turbines across the group or wind farm 1 and assign them desired nacelle yaw positions based on the simulated model prediction. Then it checks the power produced with downstream turbines to determine if the turbine desired nacelle yaw position dialed in upstream has induced the desired results downstream. If the results are not as predicted, the coordinated yaw controller 20 revises the turbine desired nacelle yaw position to try to increase the power improvement effect downstream based on a feedback algorithm. In some circumstances, the coordinated yaw controller 20 intentionally misaligns upstream turbines, which can provide a net power benefit by mitigating harmful wake effects. Advantageously, wake steering results in increased power output and lifetime extension.

The wake steering and farm level yaw control could also be used to mitigate downstream turbine mechanical loading instead of to increase energy production. In exemplary embodiments, the farm or group level control could use more than wake steering to help the turbine interaction, such as purposefully derating the upstream turbines to achieve a similar wake reduction effect downstream. Exemplary embodiments utilize a calibrated wake steering model, optimizing a wind plant using bins of wind speed, wind direction, and nacelle TI present in a large amount of 10-minute SCADA data. Optimum yaw position values are computed for all turbines in all bins, and both the total wake losses and the recoverable wake losses are estimated.

Figure 10:
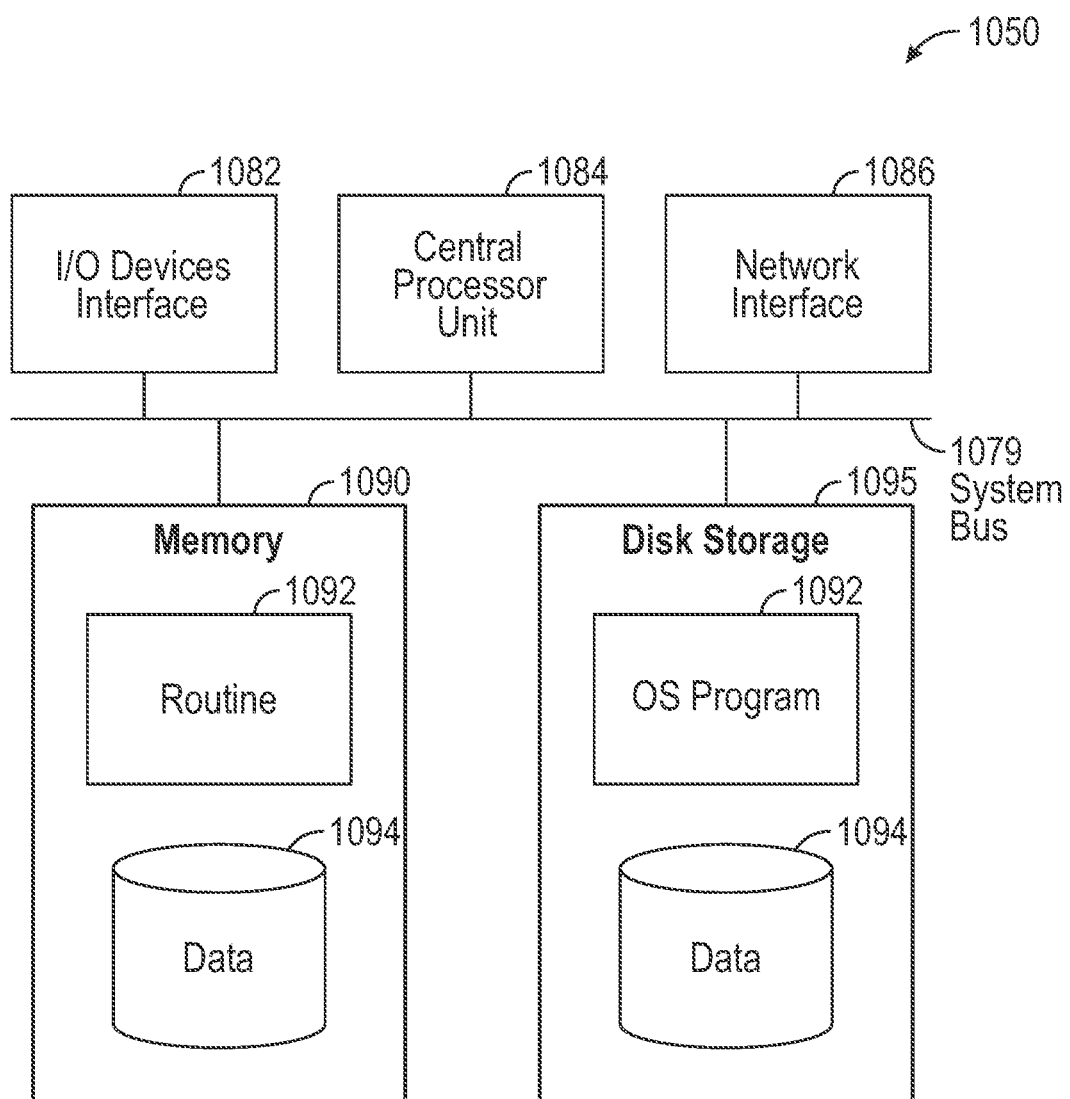
FIG. 10 is a block diagram showing an exemplary embodiment of the internal structure of a computer in which various embodiments of the disclosure may be implemented.

FIG. 10 shows an exemplary internal structure of a computer 1250 in which various embodiments of the present disclosure may be implemented. For example, the computer 1250 may act as a coordinated yaw controller 20. The computer 1250 contains a system bus 1279, where a bus is a set of hardware lines used for data transfer among the components of a computer or processing system. Bus 1279 is essentially a shared conduit that connects different elements of a computer system (e.g., processor, disk storage, memory, input/output ports, network ports, etc.) that enables the transfer of information between the elements. Attached to system bus 1279 is I/O device interface 1282 for connecting various input and output devices (e.g., sensors, transducers, keyboard, mouse, displays, printers, speakers, etc.) to the computer 1250. Network interface 1286 allows the computer 1250 to connect to various other devices attached to a network (e.g., wind farm system 130, SCADA system, wind farm controller, individual turbine control units, weather condition sensors, data acquisition system etc.).

Memory 1090 provides volatile storage for computer software instructions 1292 (e.g., instructions for the processes/calculations described above, for example, receiving operating state information from the wind farm system and sensor data from the blade sensors to calculate cyclic loads, the processes for cycle counting, calculating the cyclic loads, determining the cyclic loading's effect on the life span of a wind turbine or specific component thereof, the bending moment calculations and calibration calculations) and data 1294 used to implement an embodiment of the present disclosure. Disk storage 1295 provides non-volatile storage for computer software instructions 1292 and data 1294 used to implement an embodiment of the present disclosure. Central processor unit 1284 is also attached to system bus 1279 and provides for the execution of computer instructions.

In an exemplary embodiment, the processor routines 1292 (e.g., instructions for the processes/calculations described above) and data 1094 are a computer program product (generally referenced 1292), including a computer readable medium (e.g., a removable storage medium such as one or more DVD-ROMs, CD-ROMs, diskettes, tapes, etc.) that provides at least a portion of the software instructions for the invention system. Computer program product 1292 can be installed by any suitable software installation procedure, as is well known in the art.

In another embodiment, at least a portion of the software instructions may also be downloaded over a cable, communication and/or wireless connection. Further, the present embodiments may be implemented in a variety of computer architectures. The computer of FIG. 10 is for purposes of illustration and not limitation of the present disclosure. In some embodiments of the present disclosure, the data analysis and augmented control system may function as a computer to perform aspects of the present disclosure.

Thus, it is seen that systems and methods of coordinated yaw control of multiple wind turbines are provided. It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein. Embodiments may therefore typically be implemented in hardware, firmware, software, or any combination thereof.

While embodiments of the disclosure have been particularly shown and described with references to example embodiments thereof, it will be understood by those skilled in the art that various changes in form and details may be made therein without departing from the scope of the invention encompassed by the appended claims. For example, the disclosed augmented control is described in the context of wind farms and wind turbines, but may be applied to augment control of other turbines, such underwater turbines.

What is claimed is:

1. A method of control and optimization of wind turbines comprising:
analyzing environmental conditions across an area occupied by a plurality of wind turbines;
collecting and analyzing yaw control data of one or more of the plurality of wind turbines;
collecting and analyzing wind direction data across the area occupied by the plurality of wind turbines and determining a collective wind direction across the area;
determining whether the one or more of the plurality of wind turbines has a relative wind direction measurement bias causing yaw misalignment;
if the one or more of the plurality of wind turbines has a yaw misalignment, calculating a static yaw misalignment error based on the environmental conditions; and
applying the yaw misalignment error as an offset correction regularly to account for the environmental conditions and correct the static yaw misalignment error.

2. The method of claim 1 wherein the environmental conditions comprise one or more of: air density, temperature, and turbulence.

3. The method of claim 1 wherein the regular application of the static yaw misalignment error as an offset correction is at intervals of seconds, minutes, or hours.

4. The method of claim 1 further comprising performing data analytics and optimization and the calculating of the static yaw misalignment error as an offset correction in a cloud.

5. The method of claim 1 further comprising providing monitoring and control capability via a graphical user interface.

6. The method of claim 1 wherein the calculating and applying of the static yaw misalignment error as an offset correction is performed for only a subset of the plurality of wind turbines.

7. A method of autonomous farm-level control and optimization of wind turbines comprising:
   collecting and analyzing yaw control data of one or more of a plurality of wind turbines;
   collecting and analyzing wind direction data across an area occupied by the plurality of wind turbines;
   predicting area conditions across an area occupied by the plurality of wind turbines, the area conditions including one or more of: wind direction change, wind speed change, onset of icing, and extreme wind events;
   determining desired nacelle yaw positions of one or more of the plurality of wind turbines from a collective yaw optimization of the plurality of wind turbines based upon analysis of the yaw control data, wind direction data, and power production data; and
   sending yaw control signals including instructions for the desired nacelle yaw positions to one or more of the plurality of wind turbines in advance of the predicted area conditions such that the wind turbines move dynamically and each wind turbine aligns its nacelle to its respective desired nacelle yaw position to improve performance of the plurality of wind turbines as a function of time.

8. The method of claim 7 further comprising determining which of the plurality of wind turbines are upstream wind turbines and derating one or more of the upstream wind turbines to prepare for one or more of the predicted area conditions.

9. The method of claim 7 further comprising providing monitoring and control capability via a graphical user interface.

10. A method of control and optimization of wind turbines comprising:
    collecting and analyzing yaw control data of a plurality of wind turbines;
    collecting and analyzing wind direction data across an area occupied by the plurality of wind turbines;
    determining a subset of the plurality of wind turbines to control;
    determining desired nacelle yaw positions for the subset of the plurality of wind turbines from a collective yaw optimization of the plurality of wind turbines based upon analysis of the yaw control data and the wind direction data; and
    sending nacelle yaw position instructions to the subset of the plurality of wind turbines such that the subset of the plurality of wind turbines moves dynamically and each of the subset of the plurality of wind turbines aligns its nacelle to a collectively determined wind direction correcting the bias in the relative wind direction measurement on each turbine.

11. The method of claim 10 further comprising determining which of the subset of the plurality of wind turbines are upstream wind turbines and assigning the upstream wind turbines desired nacelle yaw positions of the nacelle relative to its respective tower such that the downstream wind turbines increase power production.

12. The method of claim 10 further comprising performing data analytics and optimization in a cloud.

13. A system of collective yaw control of a plurality of wind turbines comprising:
    a turbine control module in a turbine control unit of each of a plurality of wind turbines, each wind turbine including a tower and a nacelle mounted to the top of the tower;
    a software module in the turbine control unit of each of the plurality of wind turbines, the software module collecting and analyzing yaw control data of a plurality of wind turbines and wind direction data relating to the plurality of wind turbines, determining collective wind direction across an area occupied by the plurality of wind turbines, determining desired nacelle yaw position from a collective yaw optimization of the wind turbines, and sending yaw control signals including desired nacelle yaw position instructions to the turbine control module such that each wind turbine moves its nacelle to the desired yaw position relative to true north;
    wherein one or more of the plurality of wind turbines communicates wind information to another of the plurality of wind turbines to maximize performance of the plurality of wind turbines.

14. The system of claim 13 wherein the software module aligns the plurality of wind turbines to achieve collective yaw optimization.

15. The system of claim 13 wherein the software module performs wake steering to reduce wake interaction and wake losses.

16. The system of claim 13 further comprising a graphical user interface for remote monitoring and controlling of the system.

17. The system of claim 16 wherein the graphical user interface includes real-time feedback on behavior of the decentralized system and an on/off control.

18. The system of claim 13 wherein the desired nacelle yaw position instructions are computed for the plurality of turbines in bins of wind speed, wind direction, and nacelle turbulence intensity present in SCADA data.

* * * * *